United States Patent [19]

Baker et al.

[11] 4,378,241
[45] Mar. 29, 1983

[54] METHOD FOR ACHIEVING LOW SULFUR LEVELS IN THE DRI PRODUCT FROM IRON OXIDE REDUCING KILNS

[75] Inventors: Alan C. Baker; Vitie P. Keran, both of Harriman, Tenn.; Geoffrey N. Boulter, New York, N.Y.

[73] Assignee: The Direct Reduction Corporation, New York, N.Y.

[21] Appl. No.: 203,275

[22] Filed: Nov. 3, 1980

[51] Int. Cl.³ ............................................ C21B 13/08
[52] U.S. Cl. ........................................ 75/36; 266/173
[58] Field of Search ...................................... 75/33–38; 266/173

[56] References Cited

U.S. PATENT DOCUMENTS

| | | | |
|---|---|---|---|
| 3,029,141 | 4/1962 | Sibakir et al. | 75/34 |
| 3,180,725 | 4/1965 | Meyer et al. | 75/33 |
| 3,705,795 | 12/1972 | Heitmann | 75/36 |

Primary Examiner—M. J. Andrews
Attorney, Agent, or Firm—Cooper, Dunham, Clark, Griffin & Moran

[57] ABSTRACT

A method for maintaining the sulfur level below 0.05% by weight, and preferably below 0.02% by weight, in the DRI product from the process for directly reducing ore containing iron oxides in a rotary kiln using a solid carbonaceous reducing agent, fed at the materials feed end and at the discharge end of the kiln, as both fuel and reductant is disclosed, identifying the important factors in the process affecting the sulfur levels in the DRI and steps and means for properly controlling these factors.

7 Claims, 1 Drawing Figure

METHOD FOR ACHIEVING LOW SULFUR LEVELS IN THE DRI PRODUCT FROM IRON OXIDE REDUCING KILNS

BACKGROUND OF THE INVENTION

The present invention relates to a process for the direct reduction of materials containing iron oxides in a rotary kiln using a solid carbonaceous reducing agent as the fuel and reductant and more particularly, to a method for controlling the sulfur level in the sponge iron or directly reduced iron (DRI) resulting from such a process.

One of the most important restrictions on the chemical content of the DRI product resulting from the direct reduction of ores and other materials containing iron oxides is the level of sulfur in the DRI since severe process difficulties are posed to processors using such DRI for the making of steel by even small amounts of sulfur in their feed stock. Accordingly, a strict upper limit of 0.05% sulfur by weight in the DRI product should be achieved and preferably even lower sulfur levels would be desirable. To this end, a conventional practice in the process for directly reducing iron ores in a rotary kiln using coal fed at both the ore feed and discharge ends, is to add a sulfur control agent, such as limestone or dolomite, to the charge at the feed end of the kiln.

The present invention is directed to monitoring and controlling the key process factors bearing on the sulfur level in the DRI produced by the process to achieve the desired low levels, for example, less than 0.02% by weight, while maintaining process productivity.

SUMMARY OF THE INVENTION

In accordance with the present invention it has been determined that the necessary chemical balance to achieve desirable low sulfur levels in DRI produced in a rotary kiln, using a solid carbonaceous reducing agent as fuel and reductant and an oxygen-containing gas, may easily be upset by one or more of the following process factors:

(1) high temperatures in the kiln bed;
(2) low level of charred reductant or char in the kiln discharge materials;
(3) inadequate control of limestone or dolomite feeding;
(4) recycling of used limestone or dolomite in the char from the kiln discharge that is returned to the kiln;
(5) the fines content of the ore feed;
(6) the sulfur level in the reductant feed, particularly feed coals;
(7) the sulfur level in the ore feed;
(8) inadequate control of the feed end bed and gas temperature profiles to promote oxidation of the sulfur in the feed end reductant; and
(9) contamination of the product pellets by char, grease or the like.

Consequently, correct control of the sulfur content of the DRI so produced requires that most or all of these factors be closely observed and regulated. The present invention involves particular methods and techniques for properly regulating these factors in such manner that sulfur levels of 0.02% by weight in the DRI product can be easily and continuously achieved.

BRIEF DESCRIPTION OF THE DRAWINGS

The FIGURE is a diagrammatic view of a direct reduction plant illustrating the appropriate equipment and steps in carrying out a process for the production of DRI in which plant and process the present invention may be applied.

DETAILED DESCRIPTION OF THE PREFERRED EMBODIMENT

Figure 1:
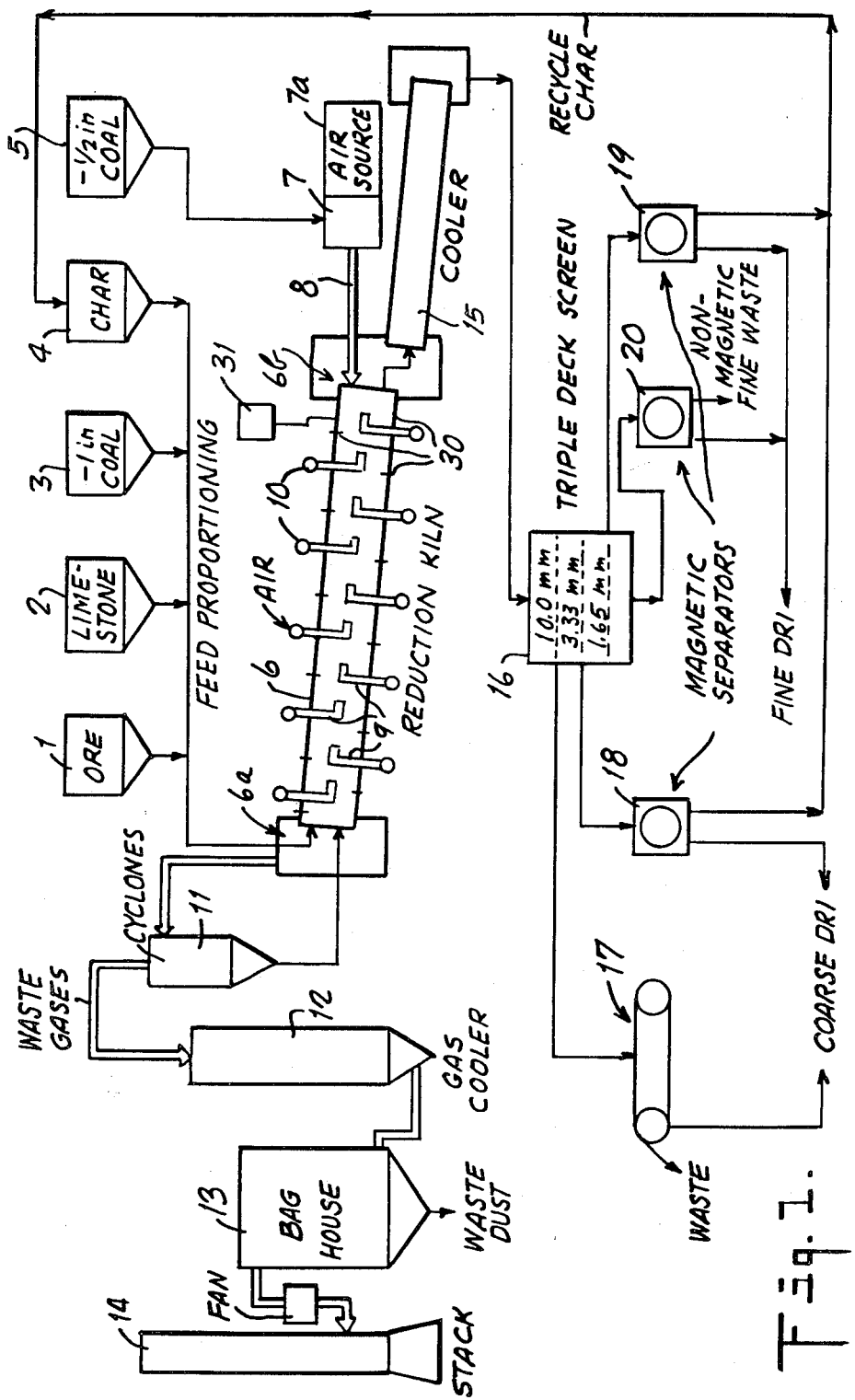

A flow diagram of a direct reduction plant for the production of DRI, of the type utilizing a rotary kiln, into which a solid carbonaceous material acting as both fuel and reductant is fed at both the charge feed end and the discharge end, and in connection with which the present invention may be practiced, is shown in the FIGURE. The plant comprises an array of feed bins respectively including: a bin 1 for supplying a source of iron oxides, such as ore, typically in the form of iron oxide pellets or natural lump ore; a bin 2 for providing desulfurizing agent such as limestone or dolomite for sulfur control; a bin 3 for providing a suitable carbonaceous reducing agent, typically in the form of coal of less than 1 inch nominal diameter particles; and a bin 4 for supplying recycle char. The iron ore, coal, return or recycle char, and dolomite or limestone are accurately proportioned and fed continuously as a charge to the feed end 6a of the reduction kiln 6. A remaining bin 5 supplies coal, typically of less than ½ inch nominal diameter particles to the feed end 6b of the rotary kiln 6, where carefully controlled quantities are injected or blown in. The coal is fed to a fireman device 7 from which it is blown by means of low pressure carrier air from a suitable source 7a, through a coal injection pipe 8 which can be adjusted to achieve the optimum trajectory for this coal. A suitable system for the blowing and adjusting is disclosed in U.S. Pat. No. 4,306,643, assigned to the same assignee as the present application.

The reduction kiln 6 may be typically 11.5 feet (3.5 meters) in outside shell diamter and 148 feet (45 meters) long, sloped at 3%. It may be supported on two tires and driven by a 200 horsepower variable speed D.C. motor and lined with 8 inches of refractory brick or preferably castable refractory.

In addition to the introduction of carrier air through pipe 8, the kiln is equipped with a series of shell mounted air injection tubes 9 which are spaced along its length and extend into the interior of the kiln for drawing air from the outside and injecting it along the kiln axis to enhance combustion. Each of the tubes 9 is equipped with its own fan and motor combination 10 so that the rate of injection may be properly regulated at spaced positions along the kiln. Also, spaced along the kiln are twelve thermocouples 30 which measure the average temperature of the charge in the kiln and of the gas.

The hot waste gas or off-gases exhaust from the feed end 6a of the kiln and pass into an off-gas processing or cleaning system. In a suitable cleaning system the gases may be passed first to twin refractory-lined scalping cyclones 11, which remove and recycle coarse dust and then to a 57 feet high by 11.5 feet inside diameter spray cooling tower 12 where they may be cooled to 500° F. before passing to an 8-cell bag house 13 equipped with glass fiber bags for removing the fine dust. The cleaned gases may exit via an induced draft fan and a 100 feet high stack 14.

The material discharged from the discharge end 6b of reduction kiln 6 by means of a sealed transfer chute consists of a mixture of DRI, coal char, coal ash, residual desulfurizing agent and other fine nonmagnetic particles. This material is cooled in a rotary cooler 15 which is sealed from the ambient atmosphere, fitted with lifters, and cooled externally with water. The cooled mixture is then passed from the cooler 15 to a screening system 16 and screened. The two oversized fractions are subjected to magnetic separation in respective magnetic separators 17 and 18, and the remaining fines are magnetically separated in separators 19 and 20. Separators 17 and 18 remove the coarse DRI to the product load out area. The nonmagnetic fractions from the separators 18 and 19 are conveyed to the return char bin 4. This separation system then yields coarse and fine DRI, recycle char and fine nonmagnetic waste.

In a plant such as shown in, and described in connection with, FIG. 1, with proper control of combustion conditions over the kiln bed and reduction conditions in the bed, high rates of heat transfer and optimum utilization of kiln volume, with metallization consistently in a 90%-95% range, can be achieved.

Regarding the process itself, directly reducing iron oxides in the rotary kiln using solid carbonaceous material derived from coal as the source of heat and reductant involves complex gas/solid reaction mechanisms. Overall reduction kinetics are affected by bed temperature, solids particle size, carbon/iron oxide ratio in the bed, reactivity of the char produced from the coal, the effect of catalysts on char reactivity, and reducibility of the iron oxide. Control of the rate of heat transfer to the bed and control of bed temperature are critical parameters for steady operation of the kiln so that stable process chemistry and kinetics result.

A critical feature in the process chemistry is maintaining the necessary chemical balance to achieve desirably low sulfur levels in the DRI product, which balance may be easily upset by a number of process factors. Experience with the process has revealed that the most important factors in this regard are the following:

(1) high temperatures in the kiln bed;
(2) low level of charred coal or char in the kiln discharge materials;
(3) inadequate control of limestone or dolomite feeding;
(4) recycling of used limestone or dolomite in the char from the kiln discharge that is returned to the kiln;
(5) the fines content of the ore feed;
(6) the sulfur level in the feed coals;
(7) the sulfur level in the ore feed;
(8) inadequate control of the feed end bed and gas temperature profiles to promote oxidation of the sulfur in the feed end coal; and
(9) contamination of the product pellets by char, grease or the like.

To consistently achieve less than 0.02% sulfur levels in the DRI product, most or all of these factors should be closely observed and regulated. In accordance with the present invention, particularly suitable methods and techniques for this purpose will now be described.

Kiln Bed Temperatures

The reduction of iron oxides in rotary kilns by coal-derived carbon monoxide is strongly temperature dependent, with high kiln bed temperatures being desirable in order to achieve optimum production rates of DRI. However, it has been the practice in some of the prior art to operate with temperatures restricted to at or below 1100° C. solely to inhibit sinter formation. During work on the present invention, it was found by detailed analysis of DRI pellets of relatively high sulfur content that sulfur absorption occurs predominantly on and adjacent to the surface of such pellets. Further, plant experience, analysis and experimentation with the process of the present invention have revealed that sulfur absorption problems occur in the bed over about the last one-third of the kiln length, and more specifically in the region where high residence times and the highest bed temperature conditions prevail, that is, the "working zone." Also in accordance with the present invention, it has been found that bed temperatures in excess of $1070 \pm 15°$ C., if sustained, may often cause high absorption of sulfur into the DRI product, regardless of how well the kiln is operating in all other respects, or of how much limestone is added. Since excursions of temperature, mostly of a minor nature, are normally encountered in the bed, both upwardly and downwardly, the control or target temperatures for operating the process should be set such that upward excursions do not bring the kiln bed into a condition of sulfur pickup by the DRI product. As previously noted, high bed temperatures are desirable to optimize the production rates of DRI kilns, and it follows, therefore, that those skilled in the art typically attempt to use coals selected solely to cause minimum sintering at high bed temperatures. However, the high temperatures of operation for most coals likely to be so selected, may and often do exceed $1070 \pm 15°$ C., which the present invention reveals to be the upper limit beyond which sulfur in the DRI product may exceed 0.02% by weight. Consequently, in accordance with the present invention, the coal or reductant should be selected such that when used in the process, optimum rates of DRI production may be achieved while maintaining the bed temperatures within the range of $1070 \pm 15°$ C.

Char Level in the Kiln Discharge Materials

To maintain correct reducing conditions in the kiln bed and to maintain correct heat transfer characteristics, the level of fixed carbon by weight of the total kiln discharge material is set within the general range of 5% to 15%, as is known to those skilled in the art. Allowing fixed carbon levels to drop below this range can markedly and quickly cause elevation of the bed temperature, at an essentially fixed gas temperature, and thus can give rise to sulfur problems. Accordingly, closely regulating the ore, coal, and char feeding to the kiln to maintain the specified range of fixed carbon by weight in the total discharge materials from the discharge end of the kiln, contributes significantly to maintaining low levels of sulfur in the DRI.

Sulfur Control Agent Feeding

Limestone or dolomite is added to the kiln feed as the control agent for sulfur removal. The calcium carbonate contained in either of these sulfur control agents quickly transforms to CaO which captures sulfur and holds the sulfur as CaS and/or $CaSO_4$, so that it can be removed from the system. A drop in the feed rate of the control agent below a minimum level may cause a proportional rise in the sulfur available for contamination of the DRI product and the resulting contamination may show up rapidly in only a few hours of kiln operation. Sulfur levels in the DRI may rise as high as 0.15% and, even with the proper control agent feed rate restored, this high level of contamination may take many further hours to be corrected after restoration of the proper rate. It is thus vital that an adequate sulfur control agent feed rate to the kiln be maintained. The appropriate rate depends on the total sulfur input with the raw materials and the provision of the excess CaO which is required. For typical coals this rate should typically be maintained in the range from 1% to 5% by weight of ore feed. In view of the deposition of sulfur into the "working zone" of the kiln in the blown-in coal, inclusion of at least some of the control agent, if not all, with the blown-in coal may assist in sulfur control.

A further important consideration is that the sizing of the particles of limestone or dolomite feed must be closely controlled to achieve incorporation of the control agent into the bed when feeding it with the ore through the feed end of the kiln. If the particles are too small, substantial losses of the control agent may occur in the exhaust gases passing out of the feed end, but, on the other hand, large limestone particles cannot effectively absorb the sulfur. Therefore, the control agent particles should preferably be of an intermediate size with respect to the other feeds, that is, such a size as to be screenable by the separation system to avoid recycling with the return char, as explained below, so that the maximum size particles should not exceed 3.3 mm (#6 mesh Tyler screen). The minimum size should not be smaller than 0.495 mm (#32 mesh Tyler screen) to avoid the aforementioned losses in the exhaust gases at the feed end of the kiln, but this is not as important as the maximum size in the process and not a factor when all of the control agent is fed through the discharge end of the kiln with the blown-in coal.

Recycling of Used Control Agent in the Return Char

Limestone or dolomite that has passed through the kiln may have absorbed a relatively great amount of sulfur so that if it is re-fed to the kiln in the recycle char system, it can act as a sulfur source, thus slowly increasing the total sulfur load to the kiln. It is accordingly essential that a "one pass" system be developed for the control agent, that is, it must be removed from the process after one pass through the kiln. The typical procedure for accomplishing this is to use a close-sized control agent and to remove it from the kiln product and recycle char by appropriate screening as indicated above. By suitable sizing of the screens, clean char may be recovered from the discharge materials, and the sulfur-bearing "burnt" control agent rejected and removed. A typical matching of sulfur control agent size and screening in terms of Tyler screen mesh, for example, is as follows:

| Limestone or Dolomite Sizing | Screenout Point |
| --- | --- |
| 10# × 16# (1.65 mm × 0.99 mm) | 10# |
| 16# × 24# (0.99 mm × 0.791 mm) | 16# |
| 24# × 0 | 24# |

Ore Feed Screening

As previously noted, analysis of the sponge iron or DRI particles has shown that any sulfur incorporated into the product is deposited on, or in close proximity to, the particle surface. Thus, to minimize sulfur content, the surface area of the DRI formed should be minimized. Since total surface area increases sharply with the fines content of the charge, screening of the ore feed at ¼ inch or ⅛ inch will greatly reduce available surface area in the product. Actual testing has shown that screening of the ore feed to the kiln and consequently feeding of only screen oversize in the range from #6 Tyler screen mesh (⅛ in., 3.33 mm) and above will significantly decrease sulfur levels in the product.

Feed Coal Sulfur Level

As sulfur is introduced into the process by means of the feed end and blown coal, the sulfur level in the feed coals is an important consideration. Sulfur is present in the coal in inorganic form as pyritic sulfur or in organic or even sulfate form. Although the actual chemical form of the sulfur in the coal has been determined by experience to be not of great importance, still, regardless of its form, it poses a problem in the process and will, if not controlled, contaminate the DRI product. It follows that the higher the sulfur content of the coal the more effort is required to control that sulfur. As a result, regular analyses should be performed on the coals used in the process, and while the process may run acceptably with coals of up to 3% sulfur, it is preferred that coals with less than 2% be used.

Ore Feed Sulfur Level

It has been found also that ore containing the iron oxide to be reduced in the process should have a less than 0.02% sulfur content or a weight percent of sulfur which is less than that desired in the DRI product.

Kiln Feed End Temperatures

The oxidizing environment at the feed end of the kiln may be used to advantage in removing some of the sulfur from the kiln feeds. By operating at gas temperatures of greater than about 750° C. in this region rapid "roasting" of the pyritic sulfur component in the feeds is promoted with the result that oxides of sulfur are rapidly formed and removed from the charge together with a proportion of the organic sulfur which is lost with volatile evolution. This high temperature operation substantially reduces the quantity of sulfur delivered to the high temperature reducing or "working" zone of the kiln where sulfur absorption into the product may occur.

Product Pellet Contamination

Contamination of the DRI pellet product by sulfur-containing char, grease or the like, while one of the less complex factors affecting the product, may occur in a random manner so that it can be difficult to trace and eliminate. For example, char or carbon in the process may be as high as 0.5% in sulfur content, while grease may be as high as 1% sulfur. If either or both of these materials contaminates the product to any significant degree, unacceptably high sulfur levels can result. Detection of this contamination may be accomplished initially by visual inspection of the product on the separation section conveyor belts. If the grease condition is observed, the process should be stopped and any grease leakage into the cooler eliminated. The performance of the magnetic separators should be carefully monitored to avoid the return of any sulfur to the product stream, since if the magnetic field in a separator is too strong, it may draw DRI-contaminated char-containing sulfur into the product stream.

It will accordingly be seen that with the described control and regulation of the nine factors delineated above, the direct reduction process may be continuously carried out with a resulting product having sulfur levels below 0.05% and of about 0.02% by weight in the DRI.

We claim:

1. In the process for directly reducing ore and other materials containing iron oxides in rotary kilns using a supply of sulfur-and-volatiles-containing solid carbonaceous materials as the sole source of both fuel and reductant, a portion of which supply is fed at the materials feed end of the kiln through which the process gases exhaust and the remaining portion of which supply is fed at the discharge end of the kiln through which the DRI product is discharged, and wherein a sulfur control agent is also fed to the kiln for removing sulfur from the feed materials, the improvement for achieving metallization of the DRI product consistently in the range from 90% to 95% while maintaining the sulfur level therein below 0.05% by weight comprising the steps of:

using solid carbonaceous materials from said supply having less than 3% sulfur content;

using iron-oxides-containing materials with a weight percent of sulfur less than 0.05%;

screening the iron-oxides-containing materials fed to the kiln to eliminate particles thereof of a size less than about ⅛ inch;

screening the sulfur control agent fed to the kiln to limit the size of its particles to less than about ⅛ inch;

feeding the sulfur control agent at a rate in the range from 1% to 5% by weight of the iron-oxides-containing materials fed;

maintaining the temperature of the process gases above the solids bed of materials in the region toward the feed end of the kiln above about 750° C. to promote the removal of pyritic sulfur from said bed along with a proportion of the organic sulfur evolving from said bed with the volatiles from said carbonaceous materials;

maintaining the temperature of the solids bed of materials in the region toward the discharge end of the kiln within the range of about 1070±15° C. to avoid sulfur absorption by the DRI product;

maintaining the level of fixed carbon within the range of 5% to 15% by weight in the total materials discharged from the discharge end of the kiln; and returning to the kiln the charred reducing agent in the discharged materials from the kiln and screening out the sulfur control agent therefrom before returning said charred reducing agent to the kiln.

2. The process of claim 1 comprising the further step of including at least a portion of the sulfur control agent with the reducing agent fed at the discharge end of the kiln.

3. The process of claim 1, wherein said fixed carbon level is maintained by regulating the rate of feeding of the iron-oxides-containing materials and the reducing agent to the kiln.

4. The process of claim 1 comprising the further steps of:

visually inspecting the DRI product for sulfur-containing contaminants selected from the group consisting of grease and DRI-contaminated charred reducing agent; and eliminating the contaminants' source when observed.

5. The process of claim 1 wherein the iron-oxides-containing materials used have a sulfur content of less than 0.02% by weight.

6. The process of claim 1 wherein the size of the sulfur control agent particles is greater than 0.495 mm.

7. The process of claim 1 wherein the reducing agent used has a sulfur content of less than 2%.

* * * * *